US008528106B2

(12) United States Patent
Beun et al.

(10) Patent No.: US 8,528,106 B2
(45) Date of Patent: Sep. 3, 2013

(54) PROCESS FOR MATCHING A NUMBER N OF RECEPTION TERMINALS WITH A NUMBER M OF CONDITIONAL ACCESS CONTROL CARDS

(75) Inventors: Frédéric Beun, Chatou (FR); Laurence Boudier, Chatou (FR); Pierre Roque, Paris (FR); Bruno Tronel, Puteaux (FR)

(73) Assignee: Viaccess (FR)

( * ) Notice: Subject to any disclaimer, the term of this patent is extended or adjusted under 35 U.S.C. 154(b) by 1733 days.

(21) Appl. No.: 10/589,766

(22) PCT Filed: Feb. 17, 2005

(86) PCT No.: PCT/FR2005/050102
§ 371 (c)(1),
(2), (4) Date: Aug. 17, 2006

(87) PCT Pub. No.: WO2005/081526
PCT Pub. Date: Sep. 1, 2005

(65) Prior Publication Data
US 2008/0155671 A1 Jun. 26, 2008

(30) Foreign Application Priority Data
Feb. 20, 2004 (FR) ...................................... 04 50324

(51) Int. Cl.
G06F 21/00 (2006.01)
(52) U.S. Cl.
USPC ...................................... 726/29; 726/7; 726/9
(58) Field of Classification Search
USPC ........................................................ 726/29
See application file for complete search history.

(56) References Cited

U.S. PATENT DOCUMENTS 5,485,221 A * 1/1996 Banker et al. ................. 348/563
5,625,693 A * 4/1997 Rohatgi et al. ............... 713/187
(Continued)

FOREIGN PATENT DOCUMENTS

WO WO 97/35430 9/1997
WO WO 99/57901 11/1999

OTHER PUBLICATIONS

Jagannathan, V.; Karinthi, R.; Sobolewski, M.; Almasi, G. Model Based Information Access. Second Workshop on Enabling Technologies: Infrastructure for Collaborative Enterprises. Pub. Date: 1993. Relevant pp. 198-212. Found on the World Wide Web at: http://ieeexplore.ieee.org/stamp/stamp.jsp?tp=&arnumber=263048.*

(Continued)

Primary Examiner — Nathan Flynn
Assistant Examiner — Jeremiah Avery
(74) Attorney, Agent, or Firm — Baker & Hostetler LLP (57) ABSTRACT

The invention relates to a method for matching a number N of reception equipment with a number M of external security modules, each reception equipment being provided with a unique identifier, and each external security module having a unique identifier and containing information about access rights of a user to digital data distributed by an operator. The method comprises the following steps:
  memorizing a list of identifiers of reception equipment in each external security module,
  memorizing a list of identifiers of external security modules in each reception equipment, and when an external security module is connected to data reception equipment, a check plan is carried out to determine whether or not the identifier for the security module is present in the list of memorized identifiers in the connected reception equipment, and the same check plan is carried out for the identifier in the list of identifiers memorized in the security module.

57 Claims, 3 Drawing Sheets

(56) References Cited

U.S. PATENT DOCUMENTS

| | | | |
|---|---|---|---|
| 5,845,221 A * | 12/1998 | Hosokawa et al. | 701/36 |
| 6,061,057 A * | 5/2000 | Knowlton et al. | 715/744 |
| 6,292,651 B1 * | 9/2001 | Dapper et al. | 725/106 |
| 6,330,241 B1 * | 12/2001 | Fort | 370/395.1 |
| 6,334,219 B1 * | 12/2001 | Hill et al. | 725/106 |
| 6,366,585 B1 * | 4/2002 | Dapper et al. | 370/409 |
| 6,405,369 B1 * | 6/2002 | Tsuria | 725/6 |
| 6,438,550 B1 * | 8/2002 | Doyle et al. | 726/2 |
| 6,606,707 B1 * | 8/2003 | Hirota et al. | 713/172 |
| 7,181,010 B2 * | 2/2007 | Russ et al. | 380/234 |
| 7,987,510 B2 * | 7/2011 | Kocher et al. | 726/27 |
| 2006/0021057 A1 * | 1/2006 | Risan et al. | 726/26 |

OTHER PUBLICATIONS

International Search Report ISA 210.

\* cited by examiner

PROCESS FOR MATCHING A NUMBER N OF RECEPTION TERMINALS WITH A NUMBER M OF CONDITIONAL ACCESS CONTROL CARDS

TECHNICAL FIELD

The invention is in the field of security of broadcast digital data and reception equipment that will receive these data in a data and/or services distribution network and is more specifically related to a method for matching a number N of data reception equipment with a number M of external security modules, each reception equipment being provided with a unique identifier, and each external security module having a unique identifier.

The invention also relates to reception equipment that can be matched with a plurality of external security modules to manage access to digital data distributed by an operator.

STATE OF THE PRIOR ART

More and more operators are offering data and on-line services accessible from terminals provided with security processors. In general, distributed data and services are scrambled when being sent by using secret keys, and are descrambled on reception using the same secret keys previously provided to the subscriber.

Apart from classical access control techniques based on scrambling when sending and descrambling on reception of the distributed data, operators propose techniques based on matching of the reception terminal with a security processor to prevent the distributed data and services from being accessible to users who are using a stolen terminal or a pirated card.

Document WO 99 57901 describes a matching mechanism between a receiver and a security module based firstly on encryption and decryption of information exchanged between the receiver and the security module by a unique key stored in the receiver or in the security module, and secondly on the presence of a receiver number in the security module.

One disadvantage of this technique is due to the fact that the association between a receiver and the security module matched to it is set up in advance, and the operator cannot efficiently manage his collection of reception equipment to prevent this equipment being used improperly for fraudulent purposes.

One purpose of the matching method according to the invention is to enable each operator to limit use of his collection of reception equipment by dynamically controlling configuration of the reception equipment and external security modules that will cooperate with this equipment.

PRESENTATION OF THE INVENTION

The invention recommends a method for matching a number N of data reception equipment with a number M of external security modules, each reception equipment being provided with a unique identifier, and each external security module having a unique identifier, this method comprising a configuration phase and a check phase.

According to the invention, the configuration phase comprises the following steps:
  memorising a list of identifiers of reception equipment in each external security module,
  memorising a list of identifiers of external security module in each reception equipment,
and the check phase consists of authorising access to data if the identifier of an external security module connected to a reception equipment is present in the list memorised in this reception equipment, and if the identifier of said reception equipment is present in the list memorised in said external security module, otherwise disturb access to said data.

Preferably, the configuration is used only when the user connects an external security module to a reception equipment.

In one preferred embodiment, the method according to the invention comprises a step in which the operator transmits a signal to the reception equipment to manage the check phase comprising at least one of the following set values:
  activating the check phase at a programmed date or after a programmed delay,
  deactivating the check phase at a programmed date or after a programmed delay,
  specifying an absolute date (or a delay) starting from which (or after which) the check phase is activated or deactivated,
  cancelling said programmed date (or said programmed delay).

In a first variant, the operator also transmits a signal to the reception equipment containing a message to delete the list of identifiers memorised in the reception equipment.

Said signal message is transmitted to said reception equipment through an EMM (Entitlement Management Message) specific to this reception equipment.

This signal may be transmitted to a group of reception equipment through an EMM message specific to said group of reception equipment.

In a second variant, the operator also transmits a signal to the external security module containing a message to delete the list of identifiers memorised in this external security module. Said signal message is transmitted to said external security module through a specific EMM message, and can be transmitted to a group of external security modules through an EMM message specific to said group of external security modules.

According to another characteristic of the method according to the invention, the operator transmits firstly the list of M identifiers of external security modules to a reception equipment through an EMM message specific to said reception equipment, and secondly the list of N identifiers of reception equipment to an external security module through an EMM message specific to said external security module.

According to another variant, the operator transmits firstly the list of M identifiers of external security module to a group of reception equipment through an EMM message specific to the group of reception equipment, and secondly the list of N identifiers of reception equipment to a group of external security modules through an EMM message specific to said group of external security modules.

In another variant embodiment, the operator transmits a signal message for the check phase to a group of reception equipment in a private flow that is processed by a dedicated software executable in each reception equipment as a function of the identifier of said reception equipment.

Alternately, the list of identifiers of external security module is transmitted in a private flow to a group of reception equipment and is processed by a dedicated software executable in each reception equipment as a function of the identifier of said reception equipment, and the list of identifiers of reception equipment is transmitted to a group of external security modules in a private flow that is processed by a dedicated software executable in each of said external security modules or in the reception equipment to which one of said external security modules is connected, as a function of the identifier of said external security module.

In one example application of the method according to the invention, the digital data represent audiovisual programs distributed in plain text or in scrambled form.

According to another characteristic, the list of identifiers of the M security modules memorised in a reception equipment is encrypted, and the list of identifiers of the N reception equipment memorised in an external security module is encrypted.

Advantageously, the method according to the invention also includes a mechanism designed to prevent use of an EMM transmitted to the same external security module or to the same reception equipment.

EMM messages specific to a security module or a reception equipment are in the following format:

```
EMM-U_section( ) {
    table_id = 0x88                        8 bits
    section_syntax_indicator = 0           1 bit
    DVB_reserved                           1 bit
    ISO_reserved                           2 bits
    EMM-U_section_length                   12 bits
    unique_address_field                   40 bits
    for (i=0; i<N; i++) {
        EMM_data_byte                      8 bits
    }
}
```

EMM messages specific to all external security modules or to all reception equipment are in the following format:

```
EMM-G_section( ) {
    table_id = 0x8A ou 0x8B                8 bits
    section_syntax_indicator = 0           1 bit
    DVB_reserved                           1 bit
    ISO_reserved                           2 bits
    EMM-G_section_length                   12 bits
    for (i=0; i<N; i++) {
        EMM_data_byte                      8 bits
    }
}
```

EMMs specific to a sub-group of external security modules or a sub-group of reception equipment are in the following format:

```
EMM-S_section( ) {
    table_id = 0x8E                        8 bits
    section_syntax_indicator = 0           1 bit
    DVB_reserved                           1 bit
    ISO_reserved                           2 bits
    EMM-S_section_length                   12 bits
    shared_address_field                   24 bits
    reserved                               6 bits
    data_format                            1 bit
    ADF_scrambling_flag                    1 bit
    for (i=0; i<N; i++) {
        EMM_data_byte                      8 bits
    }
}
```

The method according to the invention is used in an access control system containing a plurality of reception equipment each with a unique identifier and capable of cooperating with a plurality of external security modules each with a unique identifier, each external security module containing information about a subscriber's access rights to digital data distributed by an operator, this system also including a commercial management platform communicating with said reception equipment and with said external security modules. This system also includes:

- a first module arranged in said commercial management platform and designed to generate matching queries,
- and a second module arranged in said reception equipment and external security modules and designed to process said queries to prepare a matching configuration.

The method according to the invention can be used in an architecture in which the reception equipment includes a decoder and the external security module comprises an access control card in which information about a subscriber's access rights to digital data distributed by an operator are memorised. In this case, matching is done between said decoder and said card.

Alternately, the method according to the invention can be used in an architecture in which the reception equipment includes a decoder and the external security module includes a removable security interface provided with a non-volatile memory and designed to cooperate firstly with the decoder, and secondly with a plurality of conditional access control cards to manage access to digital data distributed by an operator. In this case, matching is done between said decoder and said removable security interface.

The method according to the invention can also be used in an architecture in which the reception equipment includes a decoder provided with a removable security interface with a non-volatile memory designed to cooperate firstly with said decoder and secondly with a plurality of conditional access control cards. In this case, matching is done between said removable security interface and said access control cards.

The invention also relates to reception equipment that can be matched with a plurality of external security modules to manage access to digital data distributed by an operator. This reception equipment includes:

- a non-volatile memory designed to memorise a list of external security modules.
- means of verifying if the identifier of an external security module connected to said equipment is present in the list memorised in said non-volatile memory.

In a first embodiment, this reception equipment includes a decoder and the external security module is an access control card containing information about the access rights of a subscriber to said digital data, matching being done in this case between said decoder and said card.

In a second embodiment, this reception equipment includes a decoder and the external security module is a removable security interface provided with a non-volatile memory that will cooperate firstly with said decoder and secondly with a plurality of conditional access control cards to manage access to said digital data, matching being done in this case between said decoder and said removable security interface.

In a third embodiment, this reception equipment includes a decoder provided with a removable security interface with a non-volatile memory and that will cooperate firstly with said decoder and secondly with a plurality of conditional access control cards and matching is done between said removable security interface and said access control cards The invention also relates to a decoder that can cooperate with a plurality of external security modules to manage access to audiovisual programs distributed by an operator, each external security module having a unique identifier and comprising at least one data processing algorithm. This decoder comprises:

- a non-volatile memory that will memorise a list of external security modules, means of verifying if the identifier of an external security module connected to said decoder is present in the list memorised in said non-volatile memory.

In a first variant, said external security modules are access control cards in which information about access rights of a subscriber to digital data distributed by an operator are memorised.

In a second variant, said external security modules are removable security interfaces comprising a non-volatile memory and designed to cooperate firstly with the decoder and secondly with a plurality of conditional access control cards to manage access to digital data distributed by an operator.

The invention also relates to a removable security interface designed to cooperate firstly with a reception equipment and secondly with a plurality of conditional access control cards, to manage access to digital data distributed by an operator, each card having a unique identifier and containing information about access rights of a subscriber to said digital data.

This interface comprises:
a non-volatile memory that will be used to memorise a list of subscriber cards,
means of verifying if the identifier of a card associated with said interface is present in the list memorised in said non-volatile memory.

In a first example embodiment, the removable interface is a PCMCIA (Personal Computer Memory Card International Association) card including a digital data descrambling software.

In a second example embodiment, the removable interface is a software that can be executed either in the reception equipment or in an access control card.

The process is controlled by a computer program executable on N reception equipment that can be matched with M external security modules each with a unique identifier and in which information about access rights of a subscriber to digital data distributed by an operator are stored, this program comprises instructions for memorising a list of identifiers of part or all of N reception equipment in each external security module, and instructions to memorise a list of identifiers of part or all of the M external security modules in each reception equipment, instructions to control the identifier of an external security module connected to a reception equipment and the identifier of said reception equipment, and instructions to prevent access to said data if the identifier of the external security module connected to the reception equipment is not present in the list of identifiers previously memorised in this reception equipment or if the identifier of said reception equipment is not present in the list of identifiers previously memorised in said external security module.

BRIEF DESCRIPTION OF THE DRAWINGS

Other characteristics and advantages of the invention will become clear from the following description given as a non-limitative example with reference to the appended figures in which.

DETAILED DESCRIPTION OF PARTICULAR EMBODIMENTS

The invention will now be described within the framework of an application in which an operator broadcasting audiovisual programs uses the method according to the invention to limit use of his reception equipment to his own subscribers.

Figure 1:
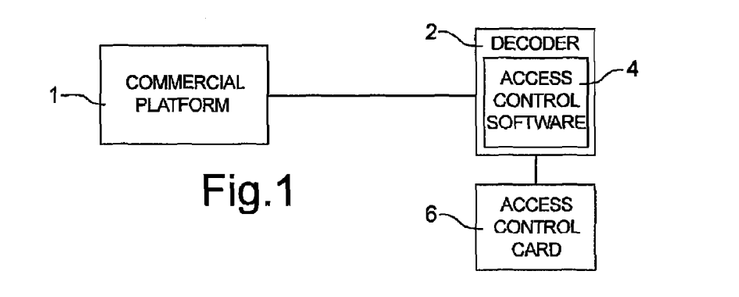
FIG. 1 shows a first system architecture for use of matching according to the invention.
Figure 2:
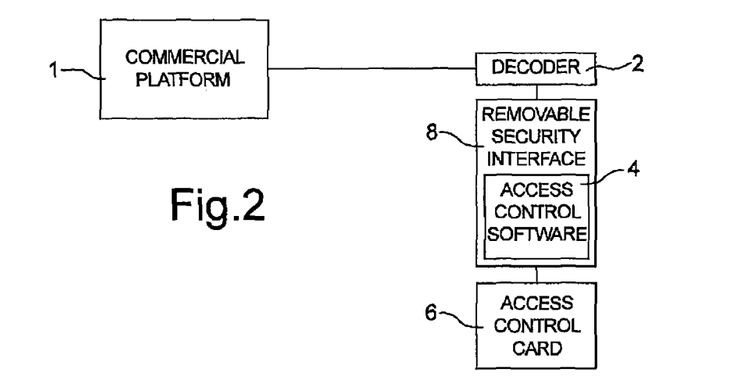
FIG. 2 shows a second system architecture for use of matching according to the invention.
Figure 3:
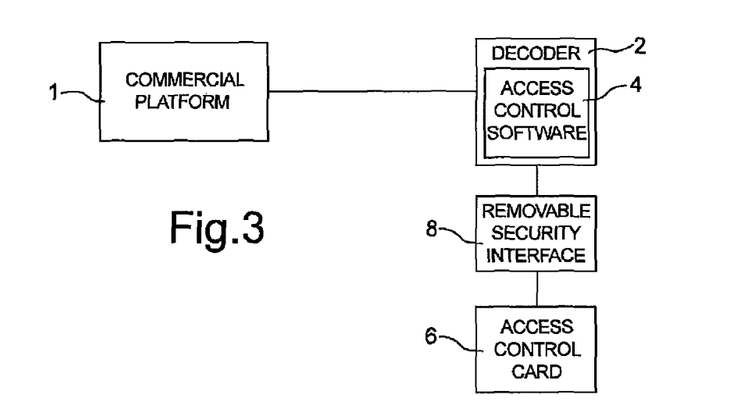
FIG. 3 shows a third system architecture for use of matching according to the invention.

The method may be used in three distinct architectures shown in FIGS. 1, 2 and 3 respectively. Identical elements in these three architectures are denoted by identical references.

Management of matching is done from a commercial platform 1 controlled by the operator and communicating with reception equipment installed at the subscriber.

In the first architecture shown in FIG. 1, the reception equipment includes a decoder 2 in which an access control software 4 is installed, and the external security module is an access control card 6 containing information about access rights of a subscriber to broadcast audiovisual programs. In this case, matching is done between the decoder 2 and the card 6.

In the second architecture shown in FIG. 2, the reception equipment includes a decoder 2 not dedicated to access control, and the external security module is a removable security interface 8 provided with a non-volatile memory and in which the access control software 4 is installed. This interface 8 cooperates firstly with said decoder 2, and secondly with a card 6 among a plurality of conditional access control cards, to manage access to said audiovisual programs.

In this architecture, matching is done between said removal security interface 8 and said access control card 6.

In the third architecture shown in FIG. 3, the reception equipment includes a decoder 2 in which an access control software 4 is installed, and which is connected to a removable security interface 8 with a non-volatile memory designed to cooperate firstly with said decoder 2, and secondly with a card 6 among a plurality of conditional access control cards.

In this case, matching is done between the decoder 2 and the removable security interface 8.

The configuration and use of matching by the operator is the result of commands sent by the commercial management platform 1 installed at the operator.

The following description relates to use of the invention in the case of matching of N dedicated decoders 2 with M cards 6. The steps used are applicable to the three architectures described above.

All matching processing is inactive when N decoders 2 leave the factory, and also after access control software 4 has been downloaded into each decoder 2. In particular:
no card identifier is memorised in the decoders 2,
check of card identifiers 6 by the decoders 2 is not active,
check by decoders 2 that the presence of their own identifier in cards 6 is not active.

Similarly, when the M cards 6 leave the factory, there is no decoder identifier 2 memorised in the cards 6.

Matching can then be configured and used in the N decoders 2 and in the M cards 6 by a query from the operator through the management platform 1 that sends:

EMM_decoder messages dedicated to matching, to the N decoders 2.

EMM_card messages dedicated to matching, to the M cards 6. These EMM_card messages are sent to the cards 6 directly or are integrated into EMM_decoder messages.

EMM_decoder messages perform the following tasks:

activate the matching function in the N decoders 2. In this case, each decoder verifies if the identifier of a card 6 inserted in the decoder card reader forms part of the identifiers that it memorised and that the identifier of this decoder 2 forms part of the identifiers of decoders memorised in this card 6. If this is not the case, a disturbance is applied in the access to data.

deactivate the matching function in the N decoders 2. In this case, each decoder 2 does not check its identifier or the identifier of the card.

load the list of M identifiers of cards 6 matched to the N decoders 2, into these decoders.

erase identifiers of cards 6 already memorised in the N decoders 2.

EMM_Card Messages:

load the list of N identifiers of decoders 2 matched to these cards, in the M cards 6.

erase the identifiers of decoders 2 already memorised in the M cards 6.

Addressing of EMM Messages

EMM messages used for configuration and use of functions related to matching according to the method according to the invention are sent in an EMM channel of a digital multiplex as defined by the MPEG2/System standard and DVB/ETSI standards.

This channel can broadcast EMMs referencing a card address so that they can be addressed directly to:

a particular card, cards in a particular group, all cards,

This channel can also broadcast EMMs referencing a decoder address so that they can be addressed directly to:

a particular decoder, a particular group of decoders, all decoders,

Messages intended for a particular card or for a particular decoder are EMM-U messages with the following structure:

```
EMM-U_section( ) {
    table_id = 0x88                    8 bits
    section_syntax_indicator = 0       1 bit
    DVB_reserved                       1 bit
    ISO_reserved                       2 bits
    EMM-U_section_length               12 bits
    unique_address_field               40 bits
    for (i=0; i<N; i++) {
        EMM_data_byte                  8 bits
    }
}
```

The unique_address_field parameter is the unique address of a card in a card EMM-U or the unique address of a decoder in a decoder EMM-U.

Messages intended for cards in a particular group of cards or decoders in a particular group of decoders are EMM-S messages with the following structure:

```
EMM-S_section( ) {
    table_id = 0x8E                    8 bits
    section_syntax_indicator = 0       1 bit
    DVB_reserved                       1 bit
    ISO_reserved                       2 bits
    EMM-S_section_length               12 bits
    shared_address_field               24 bits
    reserved                           6 bits
    data_format                        1 bit
    ADF_scrambling_flag                1 bit
    for (i=0; i<N; i++) {
        EMM_data_byte                  8 bits
    }
}
```

The shared_address_field parameter is the address of the group of cards in a card EMM-S or the address of the group of decoders in a decoder EMM-S. A decoder in a group or a card in a group is concerned by the message if it is also explicitly designated in an ADF field contained in EMM_data_byte and that can be encrypted using the ADF_scrambling_flag information.

Messages intended for all cards or all decoders are EMM-G messages with the following structure:

```
EMM-G_section( ) {
    table_id = 0x8A ou 0x8B            8 bits
    section_syntax_indicator = 0       1 bit
    DVB_reserved                       1 bit
    ISO_reserved                       2 bits
    EMM-G_section_length               12 bits
    for (i=0; i<N; i++) {
        EMM_data_byte                  8 bits
    }
}
```

Content of Decoder EMM Messages

Figure 4:
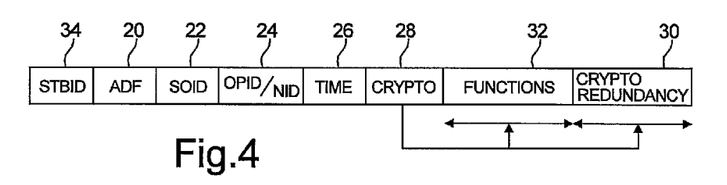
FIG. 4 shows the structure of EMM_decoder messages for configuration and use of matching functions according to the invention.

FIG. 4 diagrammatically shows the content of EMM_data_byte data in a matching EMM_decoder message. This content depends on the function to be executed by a decoder 2 for configuration or use of matching.

EMM_data_byte data include the following functional parameters:

ADF 20: address complement of a decoder in a group of decoders; this parameter is useful for addressing by group, otherwise it can be omitted; it can be encrypted.

SOID 22: identification of matching message according to the invention, among other types of messages.

OPID/NID 24: identification of the group of decoders and the operator's signal.

TIME 26: time dating data for sending the message; this parameter is used to avoid the need to replay the message by the same decoder CRYPTO 28: identification of cryptographic protection functions applied to FUNCTIONS parameters 32; FUNCTIONS parameters can be encrypted and protected by a cryptographic redundancy 30.

FUNCTIONS 32: all parameters describing the configuration and use of matching.

STBID 34: unique address of the decoder concerned by the message. This parameter is present in a decoder EMM-U, otherwise it can be omitted.

The above functional parameters are freely organised in the EMM_data_byte data of an EMM_decoder message. One preferred implementation is the combination of these parameters by a T L V (Type Length Value) structure.

Content of Card EMM Messages

Figure 5:
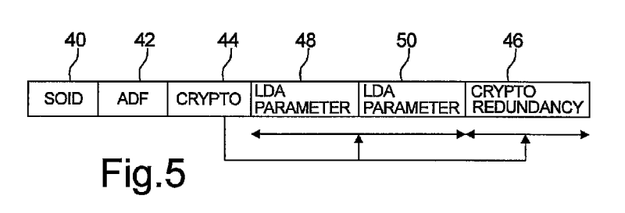
FIG. 5 shows the structure of EMM_card messages for configuration of matching functions according to the invention.

FIG. 5 diagrammatically shows the content of EMM_data_byte data in a matching EMM_Card message. This content is used to write, modify or erase a list of terminal identifiers.

EMM_data_byte data include the following functional parameters:

SOID 40: operator identification.

ADF 42: address complement of a card in a group of cards; this parameter is useful when addressing by group, otherwise it can be omitted; it can be encrypted.

CRYPTO 44: identification of cryptographic protection functions applied to the LDA parameter 48 and to other parameters 50; parameters 48 and 50 can be encrypted and protected by cryptographic redundancy 46.

LDA 48 (List of authorised decoders): this parameter contains the list of decoder identifiers with which the card can operate.

EMM_data_byte data can also contain other parameters 50 concerning functions of the card other than matching.

Parameters in the EMM_data_byte data are freely organised in these data of a card EMM message. One preferred implementation is the combination of these parameters by a T L V (Type Length Value) structure.

Configuration and Use of Matching

The complete set of all FUNCTIONS parameters 32 in an EMM_decoder describes the configuration and use of matching according to the invention. This set of parameters is an arbitrary combination of the following functional parameters:

MODE: this parameter activates, deactivates or reinitialises the matching solution according to the invention. After deactivation, the decoder does not check the identifier of a card inserted, but keeps the list of memorised identifiers. After reinitialisation, the decoder does not check the identifier of an inserted card and no longer has any memorised card identifiers:

LCA (List of authorised cards): this parameter loads the list of card identifiers with which it can operate, in a decoder Disturbance: this parameter describes the disturbance to be applied by the decoder in the data access in the case of a card not matched with the decoder:

Date/Delay: this parameter characterises the matching activation or deactivation date or delay.

The above functional parameters are freely organised in all FUNCTIONS parameters 32. One preferred implementation is the combination of these parameters by a T L V (Type Length Value) structure.

Furthermore, in some types of service such as a form of matching a decoder with a card, an EMM_decoder can transport one or several EMM_cards. In this case, the EMM_card(s) is (are) included in the set of FUNCTIONS parameters 32 in a manner that can be clearly identified by the decoder that can extract and provide the EMM_card(s) to the inserted card. One preferred implementation to include EMM_card in the set of FUNCTIONS parameters 32 of an EMM_decoder is to use a particular T L V structure containing EMM_card(s) with all related addressing data.

Another use of EMM_card in an EMM_decoder is to memorise that this EMM_decoder has already been processed by the decoder, in the card, so as to avoid a replay on another decoder so that this EMM can be processed once only by a single decoder; semantically, these data mean <<Already processed>> and are verified by the access control software 4 of the decoder 2 when it processes this EMM. One preferred embodiment of this anti-replay mechanism is to write these data in a FAC (Facilities Data Block) data block on the card.

Operation

Operation of matching according to the invention will now be described with reference to FIGS. 6 and 7.

Figure 6:
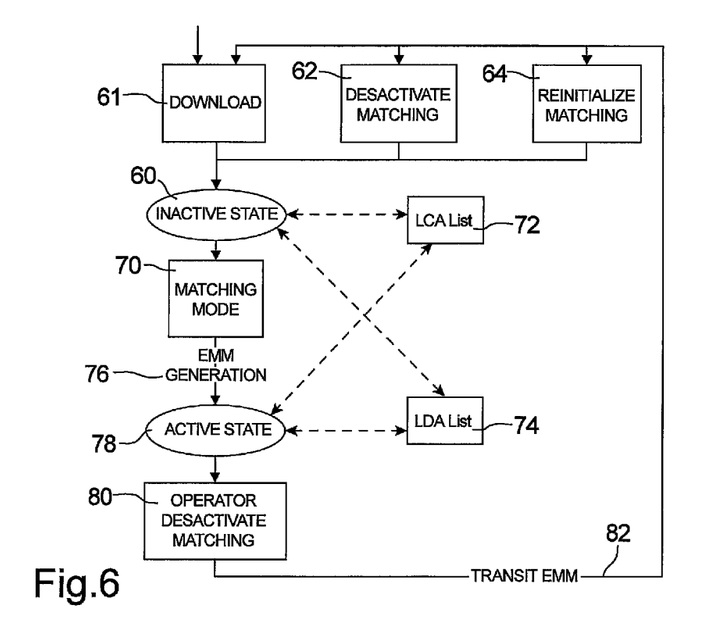
FIG. 6 is a functional diagram schematically showing the states of the matching function onboard a reception equipment.

FIG. 6 is a functional diagram diagrammatically showing states of the matching function of the access control software 4 onboard a decoder 2.

The matching function is in the inactive state 60 when the access control software 4 has just been installed or downloaded 61, or when it has received a deactivate matching order 62 or reinitialise matching order 64 from the management platform 1. In this state, the access control software 4 will operate with a card 6 inserted in the decoder 2 without verifying matching with this card.

In order to activate matching between M decoders 2 and N cards 6, the operator activates the following through the management platform 1:

processing 70 to define the matching mode (=active), and the applicable disturbance type in access to data if matching fails, processing 72 to define the LCA list to be loaded in these N decoders of identifiers of M authorised cards, processing 74 to define the LDA list to be loaded in these M cards of identifiers of N authorised decoders Depending on this information, the management platform 1 generates and sends (arrow 76):

at least one EMM_decoder message to load the LCA list of authorised cards 6 into the non-volatile memory of the N decoders 2.

at least one EMM_card message to load the LDA list of authorised decoders into the non-volatile memory of M cards 6 at least one EMM_decoder message to load configuration parameters into the non-volatile memory of the N decoders 2.

The matching function in a decoder 2 changes to the active state 78.

During activation of the matching function in a decoder 2 with loading of the LCA list of authorised cards 6 and/or the LDA list of authorised decoders 2, the configuration parameters may be taken into account by a decoder 2 with a time delay defined by the Date/Delay parameter to guarantee effective loading of the LCA list of authorised cards 6 into a decoder 2 and the LDA list of authorised decoders 2 in a card 6.

During reactivation of the matching function in a decoder 2, if the LCA list of authorised cards 6 and/or the LDA list of authorised decoders 2 does not have to be changed, the corresponding EMMs are neither generated nor sent.

The operator may deactivate (step 80) matching in a decoder 2, from the management platform 1 that generates and sends (arrow 82) an EMM message addressing the decoder(s) 2 concerned and containing a deactivation order without erasing the matching context 62 or a RESET order of the matching context 64.

The matching function in a decoder 2 changes to the inactive state 60.

Effective acceptance of the deactivation order by a decoder 2 may be delayed in time as defined by the Date/Delay parameter.

Regardless of the state of a matching function, either inactive 60 or active 78, it may receive a list of authorised LCA cards 6 through the decoder EMM (step 72) or a list of authorised LDA decoders 2 (step 74) from the management platform 1.

Figure 7:
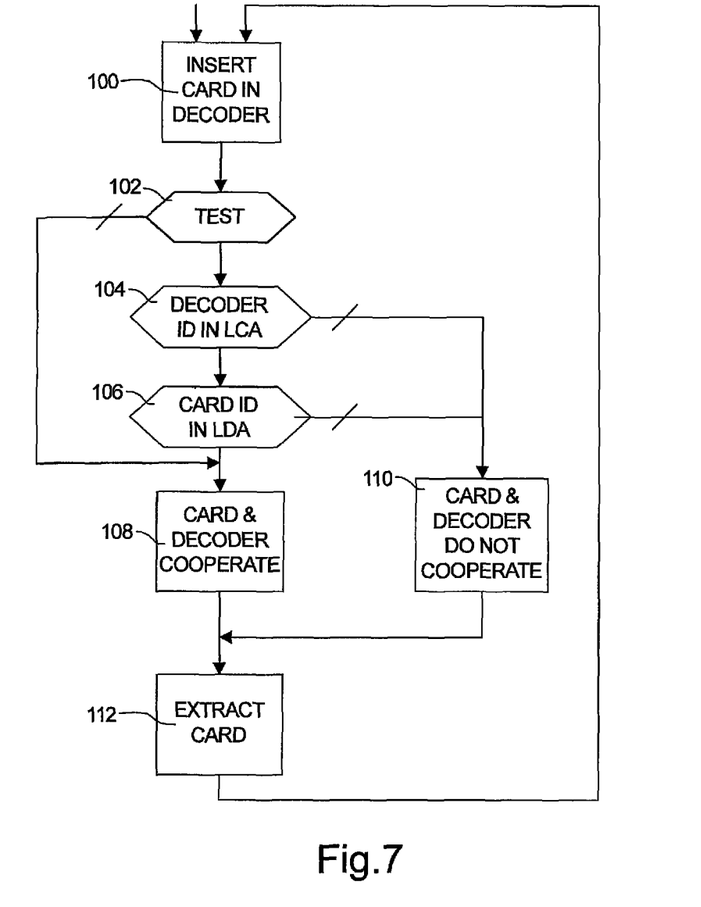
FIG. 7 shows a flowchart illustrating a particular embodiment of use of matching according to the invention.

Acceptance of one of the M cards 6 by the matching function of one of N decoders 2 is described in the flowchart in FIG. 7.

When a card 6 is inserted (step 100) into the decoder 2, the onboard access control software 4 in the decoder tests (step 102) if the matching function is in the active state 78.

If the matching function in the decoder is in the inactive state 60, the decoder will operate with the inserted card (108).

If the matching function in the decoder is in the active state 78, the access control software:

reads the identifier of the inserted card and verifies (step 104) if this identifier is in the list of authorised cards 6 memorised in the decoder 2, reads the list of authorised decoders in the inserted card and verifies (step 106) if the identifier of the decoder 2 is present in this list, The tests 104 and 106 may be executed in any order.

If the results of these two identifier tests 104 and 106 are positive, the access control software 4 accepts to operate with the inserted card 6 (step 108). Broadcast programs can then be accessed, provided that other access conditions attached to these programs are conform.

If the result of at least one of the tests 104 and 106 is not positive, the access control software 4 refuses to operate with the inserted card 6 and applies (step 110) the disturbance in data access as defined by the operator. Such a disturbance may consist of blocking access to broadcast programs. It may be accompanied by a message prompting the subscriber to insert another card 6 in the decoder 2, being displayed on the screen of the terminal with which the decoder is associated.

When the card 2 is extracted (step 112) from the decoder 2, the access control software starts waiting for a card to be inserted (step 100)

The disturbance applied in step 110 in access to data in the case of a matching fault may be of different natures, such as:

Stop audio and video on encrypted channels (obtained by not submitting ECMs to the card to calculate CWs);

Stop audio and video on plain text and analogue channels (obtained by a message to the middleware);

Send a message to the terminal middleware (example: Open TV message).

This disturbance may also be used to block stolen decoders.

In the case described in FIG. 2 in which the access control software 4 is executed in the removable interface 8 connected to a decoder 2, the logic controller described in FIG. 4 and the flowchart described in FIG. 5 are applicable directly to the onboard access control software 4 in this removable interface 8.

The invention claimed is:

1. Method for matching a number N of data reception equipment with a number M of external security modules, each reception equipment being provided with a unique identifier, and each external security module having a unique identifier, method characterised in that it comprises a configuration phase comprising the following steps:

memorizing all list of identifiers of reception equipment in each data external security module, memorizing a list of identifiers of external security modules in each reception equipment, and carrying out a check phase when an external security module is connected to a data reception equipment, comprising the following steps:

verifying whether or not the identifier for said external security module is present in the list of identifiers memorized in said reception equipment, and whether or not the identifier for said reception equipment is present in the list of identifiers memorized in said external security module, and if so, authorizing access to data using said external security module and said reception equipment, and if not, preventing access to the distributed data by means of said external security module with said reception equipment, wherein said configuration is implemented when the user connects an external security module to a reception equipment, and wherein, an operator transmits to the reception equipment a signal to manage the check phase comprising one of the following set values:

activating the check phase at or after a programmed delay, deactivating the check phase at or after a programmed delay, specifying an absolute date in which the check phase is activated or deactivated, cancelling said programmed date.

2. Method set forth in claim 1, characterized in that an operator also transmits a signal to the reception equipment (2) containing a message to delete the list of identifiers memorised in the reception equipment (2).

3. Method set forth in claim 1, characterized in that an operator also transmits to the external security module a signal containing a message to delete the list of identifiers memorized in this external security module.

4. Method set forth in claim 1, characterized in that an operator transmits the list of M identifiers of the external security modules (6, 8) to a reception equipment (2) through an EMM message specific to said reception equipment (2).

5. Method set forth in claim 1, characterized in that an operator transmits the list of identifiers of N reception equipment (2) to an external security module (6, 8) through an EMM message specific to said external security module (6, 8).

6. Method set forth in claim 1, characterized in that an operator transmits the list of M identifiers of external security modules (6, 8) to a group of reception equipment (2) through an EMM message specific to said group of reception equipment (2).

7. Method set forth in claim 1, characterized in that the operator transmits the list of identifiers of N reception equipment (2) to a group of external security modules (6, 8) through an EMM message specific to said group of external security modules (6, 8).

8. Method set forth in claim 2, 3 or 4, characterized in that the operator supplies said signal message to a reception equipment (2) through an EMM message specific to said reception equipment (2).

9. Method set forth in claim 2, 3 or 4, characterized in that the operator supplies said signal message to a group of reception equipment (2) through an EMM message specific to said group of reception equipment (2).

10. Method set forth in claim 1, characterized in that the operator supplies said signal message to an external security module through an EMM message specific to said external security module (2).

11. Method set forth in claim 5, characterized in that the operator supplies said signal message to a group of external security modules (6, 8) through an EMM message specific to said group of external security modules (6, 8).

12. Method set forth in claim 2, 3 or 4, characterized in the operator transmits a signal message for the check phase to a group of reception equipment (2) in a private flow, said private flow being processed by a dedicated software executable in each reception equipment (2) as a function of the identifier of said reception equipment (2).

13. Method set forth in claim 1, characterized in that the list of identifiers of external security module (6, 8) is transmitted in a private flow to a group of reception equipment (2) and processed by a dedicated software executable in each reception equipment (2) as a function of the identifier of said reception equipment (2).

14. Method set forth in claim 1, characterized in that the list of identifiers of reception equipment (2) is transmitted to a group of external security modules (6, 8) in a private flow that is processed by a dedicated software in each of said external security modules (6, 8) or in the reception equipment (2) to which each of said external security modules (6, 8) is connected, as a function of the identifier of said external security module (6, 8).

15. Method set forth in claim 1, characterized in that digital data are distributed in plain text or in scrambled form.

16. Method set forth in claim 15, characterized in that digital data are audiovisual programs.

17. Method set forth in claim 1, characterized in that the list of identifiers of M security modules memorized in a reception equipment (2) is encrypted.

18. Method set forth in claim 1, characterized in that the list of identifiers of N reception equipment (2) memorised in an external security module (6, 8) is encrypted.

19. Method set forth in one of claims 4 to 7, 10 and 11, characterized in that the method also includes a mechanism designed to prevent use of an EMM transmitted to the same external security module (6, 8) or to the same reception equipment (2).

20. Method set forth in claim 4, 5, or 10, characterized in that said EMM is in the following format:

```
EMM-U_section( ) {
    table_id = 0x88                     8 bits
    section_syntax_indicator = 0        1 bit
    DVB_reserved                        1 bit
    ISO reserved                        2 bits
    EMM-U_section_length                12 bits
    unique_address_field                40 bits
    for (i=0; i<N; i++) {
        EMM_data_byte                   8 bits
```

21. Method set forth in claims 4, 5 or 10, characterized in that said EMM message concerns all external security modules (6, 8) or all reception equipment (2) and is in the following format:

```
EMM-G_section( ) {
    table_id = 0x8A or 0x8B             8 bits
    section_syntax_indicator = 0        1 bit
    DVB reserved                        1 bit
    ISO reserved                        2 bits
    EMM-G_section_length                12 bits
    for (i=0; i<N; i++) {
        EMM_data_byte                   8 bits
```

22. Method set forth in claims 4, 5 or 10, characterized in that said EMM message is specific to a sub-group of external security modules (6, 8) or a sub-group of reception equipment (2) and is in the following format:

```
EMM-S_section( ) {
    table_id = 0x8E                     8 bits
    section_syntax_indicator = 0        1 bit
    DVB_reserved                        1 bit
    ISO_reserved                        2 bits
    EMM-S_section_length                12 bits
    shared_address_field                24 bits
    reserved                            6 bits
    data_format                         1 bit
    ADF_scrambling_flag                 1 bit
    for (i=0; i<N; i++) {
        EMM_data_byte                   8 bits
```

23. Method set forth in any one of claims 2, 7, 10-11 and 15-20 characterized in that the reception equipment (2) includes a decoder and the external security module (6, 8) includes an access control card (6) in which information about access rights of a subscriber to digital data distributed by an operator is memorised, and in that matching is done between said decoder and said card (6).

24. Method set forth in any one of claims 2, 7, 10-11 and 15-20, characterized in that the reception equipment (2) includes a decoder and the external security module (6, 8) includes a removable security interface (8) provided with a non-volatile memory and designed to cooperate firstly with the decoder, and secondly with a plurality of conditional access control cards (6) to manage access to digital data distributed by an operator, and in that, said matching is done between said decoder and said removable security interface (8).

25. Method set forth in any one of claims 2, 7, 10-11 and 15-20-characterized in that the reception equipment (2) includes a decoder provided with a removable security interface (8) with a non-volatile memory and designed to cooperate firstly with said decoder, and secondly with a plurality of conditional access control cards (6) and in that, said matching is done between said removable security interface (8) and said access control cards (6).

26. Reception equipment that can be matched with a plurality of external security modules (6, 8) to manage access to digital data distributed by an operator, characterized in that it includes:
   a configuration module adapted for receiving matching queries from a remote commercial management platform of the operator with said configuration module comprising:
   means for of verifying if the identifier of an external security module (6, 8) connected to said equipment is present in a list of external security modules memorized in a non-volatile memory of said reception equipment.

27. Equipment set forth in claim 26, characterized in that the equipment includes a decoder and in that the external security module (6, 8) is an access control card (6) containing information about access rights of a subscriber to said digital data, matching being done between said decoder and said card (6).

28. Equipment set forth in claim 26, characterized in that the equipment includes a decoder and in that the external security module (6, 8) is a removable security interface (8) provided with a non-volatile memory and designed to cooperate firstly with said decoder, and secondly with a plurality of conditional access control cards (6), to manage access to said digital data, said matching being done between said decoder and said removable security interface (8).

29. Equipment set forth in claim 26, characterized in that the equipment includes a decoder provided with a removable security interface (8) with a non-volatile memory and designed to cooperate firstly with said decoder, and secondly with a plurality of conditional access control cards (6) and in that matching is done between said removable security interface (8) and said access control cards (6).

30. Decoder that can cooperate with a plurality of external security modules (6, 8) to manage access to audiovisual programs distributed by an operator, each external security module (6, 8) having a single identifier and comprising at least one data processing algorithm, decoder characterized in that it includes:
- a non-volatile memory designed to memorise a list of external security modules (6, 8),
- means of verifying if the identifier of an external security module (6, 8) connected to said decoder is present in the list memorised in said nonvolatile memory.

31. Decoder set forth in claim 30, characterized in that said external security modules (6, 8) are access control cards (6) in which information about access rights of a subscriber to digital data distributed by an operator is memorised.

32. Decoder set forth in claim 30, characterized in that said external security modules (6, 8) are removable security interfaces (8) including a non volatile memory and designed to cooperate firstly with the decoder, and secondly with a plurality of conditional access control cards (6) to manage access to digital data distributed by an operator.

33. A plurality of removable security interfaces designed to cooperate firstly with a plurality of reception equipment (2), and a plurality of conditional access control cards (6), to manage access to digital data distributed by an operator, each card having a unique identifier and containing information about access rights of a subscriber to said digital data:
- wherein each of said plurality of removable interfaces include:
  - a non-volatile memory designed to memorize a list of subscriber cards containing memorized information of unique identifiers for subscribers,
  - means for verifying if the unique identifier in a control card is present in the list memorized in said non-volatile memory of a removable interface.

34. Interface set forth in claim 33 characterized in that it consists of a PCMCIA card containing a digital data descrambling software.

35. Interface set forth in claim 33 characterized in that it consists of a software.

36. Access control system including a plurality of reception equipment (2) each having a unique identifier and that can cooperate with a plurality of external security modules (6, 8) each having a unique identifier, each external security module (6, 8) containing information about access rights of a subscriber to digital data distributed by an operator, said system also including a commercial management platform (1) communicating with said reception equipment (2) and said external security modules (6, 8), characterized in that is also includes:
- a first module arranged in said commercial platform (1) and designed for generating matching queries to determine whether or not the identifier for said external security module(s) is present in the list of identifiers memorized in said reception equipment, and whether or not the identifier for said reception equipment is present in the list of identifiers memorized in said external security module(s),
- and a second module arranged in said reception equipment (2) and in said external security modules (6, 8) and designed to process said queries to prepare a matching configuration for authorizing access to data using said external security module and said reception equipment when a matching configuration exists.

37. Computer program stored in memory executable on N reception equipment (2) that can cooperate with M security modules (6, 6) each having a unique identifier and in which information about access rights of a subscriber to digital data distributed by an operator are stored, characterized in that the computer memory comprises instructions for memorising a list of identifiers of part or all of N reception equipment (2) in each external security module (6, 8), and instructions to memorize a list of identifiers of part or all of the M external security modules (6, 8) in each reception equipment (2), instructions to control the identifier of a security module connected to a reception equipment (2) and the identifier of said reception equipment (2), and instructions to prevent access to said data if the identifier of the security module (6, 8) connected to the reception equipment (2) is not present in the list of identifiers previously memorized in this reception equipment (2) or if the identifier of said reception equipment (2) is not present in the list of identifiers previously memorized in said external security module (6, 8).

38. Method as set forth in claim 19, further characterized in that the operator supplies said signal message to a reception equipment (2) through an EMM message specific to said reception equipment (2).

39. Method as set forth in claim 19, further characterized in that the operator supplies said signal message to a group of reception equipment (2) through an EMM message specific to said group of reception equipment (2).

40. Method as set forth in claim 20, further characterized in that the operator supplies said signal message to a reception equipment (2) through an EMM message specific to said reception equipment (2).

41. Method as set forth in claim 21, further characterized in that the operator supplies said signal message to a group of reception equipment (2) through an EMM message specific to said group of reception equipment (2).

42. Method as set forth in claim 22, further characterized in that the operator supplies said signal message to a group of reception equipment (2) through an EMM message specific to said group of reception equipment (2).

43. Method as set forth in claim 23, further characterized in that the method also includes a mechanism designed to prevent use of an EMM transmitted to the same external security module (6, 8) or to the same reception equipment (2).

44. Method as set forth in claim 23, characterized in that said EMM is in the following format:

| EMM-U section( ) | |
| --- | --- |
| table_id = 0x88 | 8 bits |
| section_syntax_indicator = 0 | 1 bit |
| DVB_reserved | 1 bit |
| ISO reserved | 2 bits |
| EMM-U_section_length | 12 bits |
| unique_address_field | 40 bits |
| for (i = 0; i < N; i++) | |
| EMM_data_byte | 8 bits. |

45. Method as set forth in claim 23, characterized in that said EMM message concerns all external security modules (6, 8) or all reception equipment (2) and is in the following format:

| EMM-G_section( ) | |
|---|---|
| table_id = 0x8A or 0x8B | 8 bits |
| section_syntax_indicator = 0 | 1 bit |
| DVB reserved | 1 bit |
| ISO reserved | 2 bits |
| EMM-G_section_length | 12 bits |
| for (i = 0; i < N; i++) | |
| EMM_data_byte | 8 bits. |

46. Method as set forth in claim 23, characterized in that said EMM message is specific to a sub-group of external security modules (6, 8) or a sub-group of reception equipment (2) and is in the following format:

| EMM-S_section( ) | |
|---|---|
| table_id = 0x8E | 8 bits |
| section_syntax_indicator = 0 | 1 bit |
| DVB_reserved | 1 bit |
| ISO_reserved | 2 bits |
| EMM-S_section_length | 12 bits |
| shared_address_field | 24 bits |
| reserved | 6 bits |
| data_format | 1 bit |
| ADF_scrambling_flag | 1 bit |
| for (i = 0; i < N; i++) | |
| EMM_data_byte | 8 bits. |

47. Method as set forth in claim 24, characterized in that the method also includes a mechanism designed to prevent use of an EMM transmitted to the same external security module (6, 8) or to the same reception equipment (2).

48. Method as set forth in claim 47, characterized in that said EMM is in the following format:

| EMM-U section( ) | |
|---|---|
| table_id = 0x88 | 8 bits |
| section_syntax_indicator = 0 | 1 bit |
| DVB_reserved | 1 bit |
| ISO reserved | 2 bits |
| EMM-U_section_length | 12 bits |
| unique_address_field | 40 bits |
| for (i = 0; i < N; i++) | |
| EMM_data_byte | 8 bits. |

49. Method as set forth in claim 47, characterized in that said EMM message concerns all external security modules (6, 8) or all reception equipment (2) and is in the following format:

| EMM-G_section( ) | |
|---|---|
| table_id = 0x8A or 0x8B | 8 bits |
| section_syntax_indicator = 0 | 1 bit |
| DVB reserved | 1 bit |
| ISO reserved | 2 bits |
| EMM-G_section_length | 12 bits |
| for (i = 0; i < N; i++) | |
| EMM_data_byte | 8 bits. |

50. Method as set forth in claim 47, characterized in that said EMM message is specific to a sub-group of external security modules (6, 8) or a sub-group of reception equipment (2) and is in the following format:

| EMM-S_section( ) | |
|---|---|
| table_id = 0x8E | 8 bits |
| section_syntax_indicator = 0 | 1 bit |
| DVB_reserved | 1 bit |
| ISO_reserved | 2 bits |
| EMM-S_section_length | 12 bits |
| shared_address_field | 24 bits |
| reserved | 6 bits |
| data_format | 1 bit |
| ADF_scrambling_flag | 1 bit |
| for (i = 0; i < N; i++) | |
| EMM_data_byte | 8 bits. |

51. Method as set forth in claim 25, characterized in that the method also includes a mechanism designed to prevent use of an EMM transmitted to the same external security module (6, 8) or to the same reception equipment (2).

52. Method as set forth in claim 25, characterized in that said EMM is in the following format:

| EMM-U section( ) | |
|---|---|
| table_id = 0x88 | 8 bits |
| section_syntax_indicator = 0 | 1 bit |
| DVB_reserved | 1 bit |
| ISO reserved | 2 bits |
| EMM-U_section_length | 12 bits |
| unique_address_field | 40 bits |
| for (i = 0; i < N; i++) | |
| EMM_data_byte | 8 bits. |

53. Method as set forth in claim 25, characterized in that said EMM message concerns all external security modules (6, 8) or all reception equipment (2) and is in the following format:

| EMM-G_section( ) | |
|---|---|
| table_id = 0x8A or 0x8B | 8 bits |
| section_syntax_indicator = 0 | 1 bit |
| DVB reserved | 1 bit |
| ISO reserved | 2 bits |
| EMM-G_section_length | 12 bits |
| for (i = 0; i < N; i++) | |
| EMM_data_byte | 8 bits. |

54. Method as set forth in claim 25, characterized in that said EMM message is specific to a sub-group of external security modules (6, 8) or a sub-group of reception equipment (2) and is in the following format:

| EMM-S_section( ) | |
|---|---|
| table_id = 0x8E | 8 bits |
| section_syntax_indicator = 0 | 1 bit |
| DVB_reserved | 1 bit |
| ISO_reserved | 2 bits |
| EMM-S_section_length | 12 bits |
| shared_address_field | 24 bits |
| reserved | 6 bits |
| data_format | 1 bit |
| ADF_scrambling_flag | 1 bit |
| for (i = 0; i < N; i++) | |
| EMM_data_byte | 8 bits. |

55. Method set forth in claim 8 characterized in that the reception equipment (2) includes a decoder and the external security module (6, 8) includes an access control card (6) in which information about access rights of a subscriber to digital data distributed by an operator is memorized, and in that matching is done between said decoder and said card (6).

56. Method set forth in claim 8 characterized in that the reception equipment (2) includes a decoder and the external security module (6, 8) includes a removable security interface (8) provided with a non-volatile memory and designed to cooperate firstly with the decoder, and secondly with a plurality of conditional access control cards (6) to manage access to digital data distributed by an operator, and in that, said matching is done between said decoder and said removable security interface (8).

57. Method set forth in claim 8 characterized in that the reception equipment (2) includes a decoder provided with a removable security interface (8) with a non-volatile memory and designed to co-operate firstly with said decoder, and secondly with a plurality of conditional access control cards (6) and in that, said matching is done between said removable security interface (8) and said access control cards (6).

* * * * *